United States Patent
Cooper

(10) Patent No.: US 6,286,748 B1
(45) Date of Patent: Sep. 11, 2001

(54) WELDING WIRE FEEDER

(75) Inventor: Edward L. Cooper, Clarklake, MI (US)

(73) Assignee: Elco Enterprises, Inc., Jackson, MI (US)

( * ) Notice: Subject to any disclaimer, the term of this patent is extended or adjusted under 35 U.S.C. 154(b) by 0 days.

(21) Appl. No.: 09/472,310

(22) Filed: Dec. 27, 1999

(51) Int. Cl.⁷ .............................. B23K 1/00; B23K 20/08; B23K 9/10
(52) U.S. Cl. .......................................... 228/33; 219/130.1
(58) Field of Search ............................ 228/33; 219/130.1

(56) References Cited

U.S. PATENT DOCUMENTS

| | | | | |
|---|---|---|---|---|
| 3,569,664 | * | 3/1971 | Newman et al. | 219/131 |
| 3,679,864 | * | 7/1972 | Tanegashima et al. | 219/130 |
| 3,740,518 | * | 6/1973 | Berghof | 219/72 |
| 3,741,456 | * | 6/1973 | Smith | 228/41 |
| 3,775,584 | * | 11/1973 | Moerke | 219/130 |
| 3,815,807 | * | 6/1974 | Bartley | 228/29 |
| 3,901,425 | * | 8/1975 | Taylor et al. | 226/108 |
| 4,190,186 | * | 2/1980 | Flowers et al. | 228/15.1 |
| 4,508,954 | * | 4/1985 | Kroll | 219/132 |
| 4,512,513 | * | 4/1985 | Rogers | 239/8 |
| 4,534,817 | * | 8/1985 | O'Sullivan | 156/352 |
| 4,582,979 | * | 4/1986 | Moerke | 219/137.63 |
| 4,600,824 | * | 7/1986 | Moerke | 219/137.63 |
| 4,624,410 | * | 11/1986 | Rogers | 239/83 |
| 4,665,300 | * | 5/1987 | Bellefleur | 219/137.2 |
| 4,687,899 | * | 8/1987 | Acheson | 219/76.14 |
| 4,703,156 | * | 10/1987 | Hayes | 219/136 |
| 4,705,934 | * | 11/1987 | Winkler | 219/137 PS |
| 4,801,780 | * | 1/1989 | Hayes | 219/130.1 |
| 4,801,781 | * | 1/1989 | Hori et al. | 219/137.71 |
| 4,873,419 | * | 10/1989 | Acheson | 219/125.1 |
| 4,892,990 | * | 1/1990 | Acheson | 219/76.14 |
| 4,952,769 | * | 8/1990 | Acheson | 219/76.14 |
| 5,410,126 | * | 4/1995 | Miller et al. | 219/130.1 |
| 5,811,055 | * | 9/1998 | Geiger | 266/49 |
| 5,853,655 | * | 12/1998 | Baker | 266/44 |
| 6,057,526 | * | 5/2000 | Lee | 219/145.1 |
| 6,066,834 | * | 5/2000 | Rebold | 219/137.71 |
| 6,066,835 | * | 5/2000 | Hanks | 219/137.9 |

* cited by examiner

Primary Examiner—Tom Dunn
Assistant Examiner—Zidia Pittman
(74) Attorney, Agent, or Firm—Young & Basile, P.C.

(57) ABSTRACT

A portable feeder for welding wire used to charge a welding wire guide system with a new coil of wire upon depletion of the previous welding wire coil. A casing includes a drive roller driven by a portable drill or the like, and a backup roller movably mounted upon the casing squeezes the welding wire passing through the casing between the rollers rapidly feeding the welding wire into guides formed on the casing in alignment with the wire guide system.

2 Claims, 3 Drawing Sheets

WELDING WIRE FEEDER

BACKGROUND OF THE INVENTION

1. Field of the Invention

The invention pertains feeding devices for welding wire, particularly for charging a welding wire guide system with a new coil of wire.

2. Description of the Related Art

Welding wire is commonly dispensed from large coils through a wire guide system to the welding site, i.e. the welding gun or an automated welding head. The gun or welding head includes a wire feeder for longitudinally feeding the wire into the welding arc as needed, but the welding wire feeder at the welding site is inoperable until wire has been supplied thereto.

It is not uncommon for a considerable distance to exist between the location of the welding wire coil and the welding site. Welding wire guide systems are used to guide the welding wire from the dispensing coil to the welding site, and such guide systems usually consist of elongated conduits, often having curves, bends and angles through which the wire travels. Upon a coil of welding wire being depleted, the welder feed will pull the wire through the guide system until the wire is completely depleted. Thereupon, upon new welding wire being dispensed from a new coil, the operator must insert the end of the new coil into the guide system and manually push the welding wire through the guide system, usually a difficult, time consuming and arduous task.

To this date, an effective system for feeding a new coil of welding wire into a guide system has not existed, and the invention solves this problem.

OBJECTS OF THE INVENTION

It is an object of the invention to provide a relatively small portable welding wire power feeder capable of quickly and efficiently feeding welding wire into a guide system.

Another object of the invention is to provide a welding wire feeding system using conventional power means, such as an electric or air drill, and wherein the power wire feeder may be selectively readily used with a plurality of coils of welding wire.

An additional object of the invention is to provide a portable welding wire feeder capable of being operated by persons of conventional mechanical ability, and wherein the wire feeder may be quickly loaded and adapted to a particular wire guide system.

SUMMARY OF THE INVENTION

The portable welding wire powered feeder in accord with the invention is of a relatively small size as to be hand manipulated, and a single wire feeder can be used to service a plurality of welding wire dispenser coil stations.

The welding wire feeder includes a metal casing in which a drive roller is rotatably mounted upon anti-friction bearings. A portable power source, such as an electric or air hand drill, is mounted upon the casing in an appropriate cradle or support, and is in driving relationship to the drive roller. A casing housing is pivotally mounted upon the casing for movement relative to the casing and drive roller, and a backup roller is rotatably mounted upon the casing housing upon anti-friction rollers. The pivotal mounting of the casing housing permits the backup roller to be moved toward and away from the drive roller to load or unload the feeder, and as the rollers lie in the identical plane, and each has a peripheral circumferential groove for receiving a welding wire, welding wire may be gripped between the drive and backup rollers providing sufficient frictional engagement with the welding wire to axially translate or "push" the same.

A spring biased latch holds the casing housing in its operative closed position whereby a spring biasing force is imposed upon the backup roller to squeeze the welding wire and force the welding wire against the drive roller periphery. A toothed spur gear concentrically mounted on the drive roller for rotation therewith engages the teeth of another spur gear concentrically related to the backup roller, and the teeth of the two gears mesh when the casing housing is in its operative closed position. In this manner, both rollers impose a motive force on the wire during feeding.

The casing includes guides for receiving the welding wire. The wire entrance guide is adapted to be associated with the welding wire coil discharge conduit, while the welding wire exit guide defined on the casing cooperates with the welding wire guide system, and a spring biased plunger detent may be used to temporarily interconnect the casing exit guide to the entrance of the wire guide system.

Unlatching the casing housing from its operative closed position permits the casing housing to be pivoted to an "open" position permitting the new end of a welding wire coil to be placed in a tangential relationship to the drive roller periphery, and this wire will be placed within the casing entry and exit wire guides. Pivoting of the casing housing to its closed or operative position causes the backup roller to engage the welding wire gripping the welding wire between the two rollers, and operation of the latch imposes a biasing force upon the backup roller against the wire. Rotation of the drive roller by actuating the power source rotates both the drive and backup rollers axially translating the welding wire through the casing exit guide into the welding wire guide system permitting the guide system to be rapidly charged with the new coil of welding wire and the welding wire continues to be forced into the wire guidance system until the welding wire is received by the wire feeder arrangement at the arc welding location.

The wire feeder can also be "charged" with wire from a new coil by feeding the end of the new coil into the entry wire guide until the wire end engages the contacting drive and backup rollers. Thereupon, the electric drill power source can be energized to pull the end of the wire into the casing between the rollers, and feed the wire into the casing exit guide and wire guidance system.

The casing may be suspended from a cable or spring device wherein the weight of the portable welding wire feeder need not be entirely supported by the operator. A powered welding wire feeder in accord with the invention permits an operator to quickly charge several welding wire guidance systems in a short period of time, and the practice of the invention overcomes a previously arduous and inefficient manual operation.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
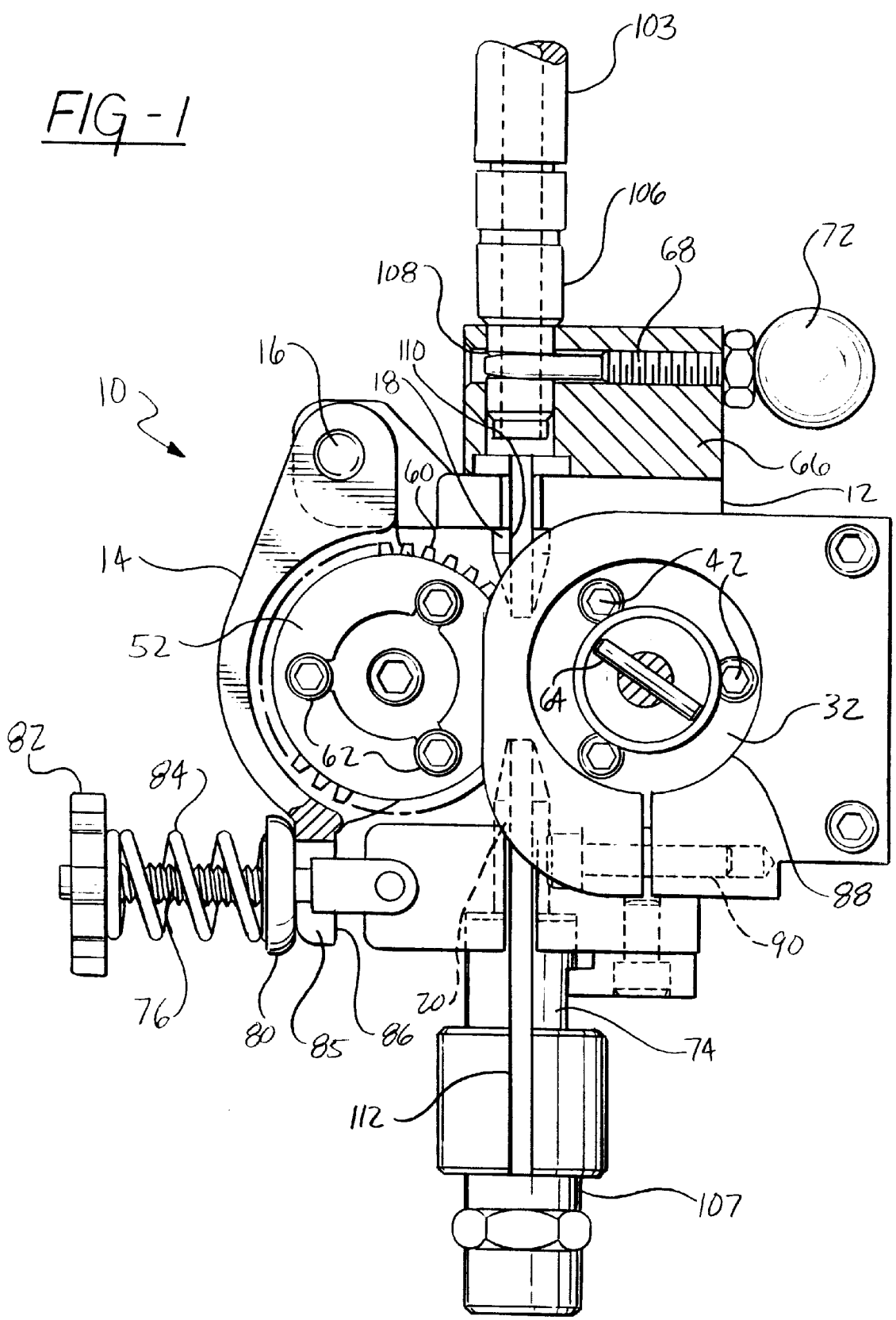
FIG. 1 is an elevational view of a wire feeder in accord with the invention, partially in section, illustrating the casing housing in the operative closed position, no wire being located within the feeder, and the electric hand drill power source not being illustrated for purpose of clarity.
Figure 2:
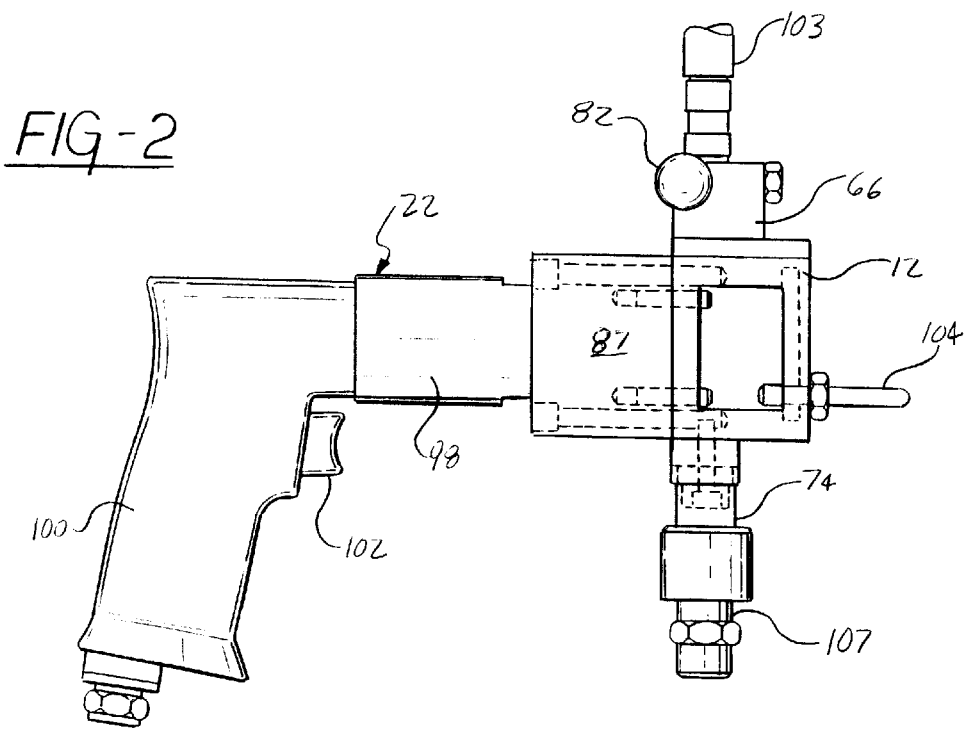
FIG. 2 is a side elevational view of the wire feeder, with the hand drill power source in position, as taken from the right of FIG. 1.

A portable powered welding wire feeder in accord with the invention is generally indicated at 10. The wire feeder 10 is of a size as to permit manual support and operation, but the weight thereof can be counterbalanced by suspension from a cable or spring.

The primary component of the wire feeder 10 is the metal casing 12 having a casing housing 14 pivotally connected thereto by pivot 16. An upper wire guide 18 is mounted upon the casing 12 constituting the exit guide for the welding wire passing through the casing, while the lower wire guide 20 constitutes the entrance guide, as later described.

Power for the wire feeder 10 is through a portable unit, preferably a portable hand drill 22 of either the electric or air type. Such unit 22 being of the type commonly available through hardware stores and the like.

A threaded cap screw 24 constitutes a shaft which is threaded into the casing 12 and supports ball bearings 26 in conjunction with an annular spacer 28. A tubular adapter 30 is mounted upon the bearings 26 and the adapter 30 supports the drive roller 32 for rotation about the axis of the shaft 24. The drive roller 32 includes a circular periphery 34 upon which a peripheral circumferential groove 36 is defined for receiving the welding wire, as later described.

A spur gear 38 having teeth 40 is concentrically mounted upon the drive roller 32 by bolts 42 wherein the driver roller and gear will rotate together.

In a like manner, a cap screw 44 is threaded into the casing housing 14 to function as a shaft for the anti-friction bearings 46 positioned by spacer 48. A tubular adapter 50 supports the backup roller 52 which has a periphery 54 in which the circumferential groove 56 is defined. A spur gear 58 is coaxially mounted upon the adapter 50 having teeth 60, and the gear 58 is connected to the backup roller 52 by the bolts 62 so that the roller 52 and gear 58 rotate in unison.

The adapter 30 includes a pin 64 located in the adapter's accessible end for cooperation with drive mechanism as will be later described.

A locator 66 is defined on the casing 12 adjacent the upper guide 18 for cooperating with the welding wire guide system, as later described, and the locator includes a plunger 68 operated through the knob 72. A lower wire guide 74 is located on the casing 12 in alignment with the lower guide 20.

A threaded latch post 76 is hinged to the casing 12 by pivot 78, and a spring cap 80 circumscribing the post 76 is in opposition to a knob 82 threaded on the post 76 wherein the spring 84 interposed between the cap 80 and knob 82 will impose a biasing force on the casing arm 86 when engaged by the spring cap 80 during the operative position of the wire feeder. In FIG. 1, the latch post 76 is shown in the operative position wherein the post is received within a slot 85 defined in the arm 86, while in FIG. 4, the latch post 76 has been pivoted to the inoperative position permitting the casing housing 14 to be swung to the open position.

Figure 3:
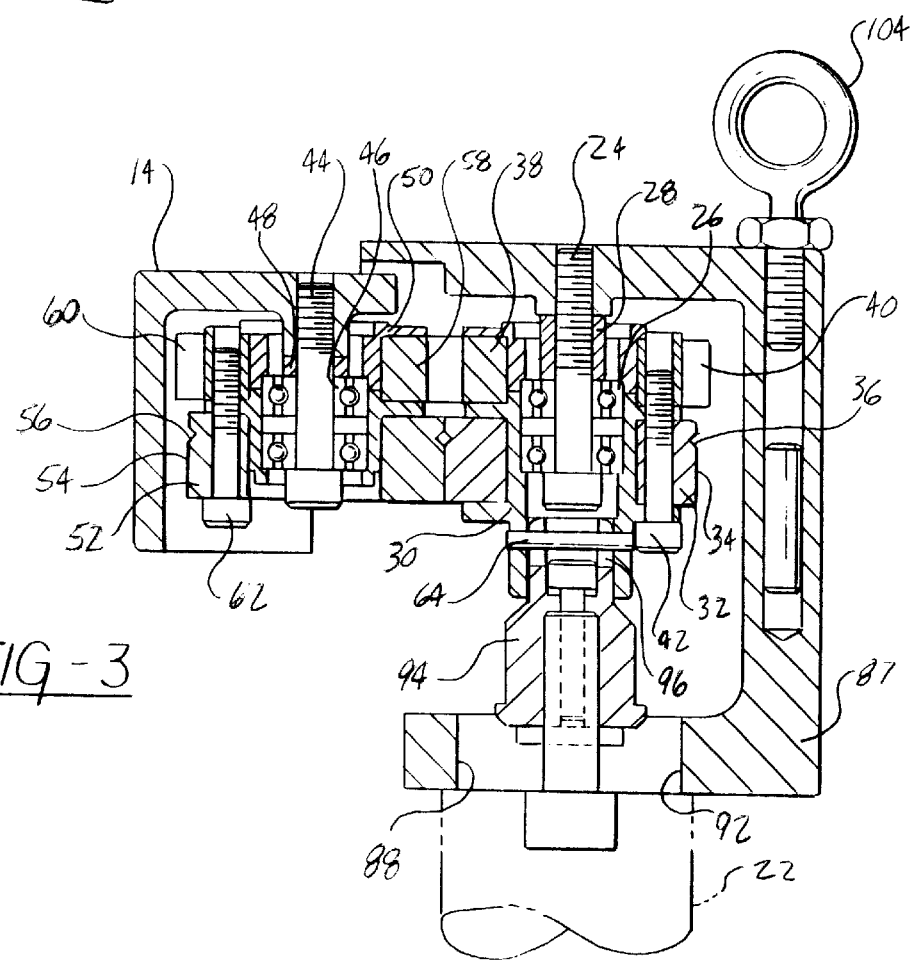
FIG. 3 is a plan sectional view taken along Section 3—3 of FIG. 1.

The casing 12 includes an extension 87 to define a split hole 88 which may be contracted by the screw 90, FIG. 1. A drill locator surface 92 defines the extent to which the drill unit 22 may be inserted into the hole 88 and the drill unit will be drivingly attached to the driver 94. The driver 94 includes a notch 96 adapted to receive the adapter pin 64, FIG. 3.

The drill unit 22 consists of a motor 98, which may be electric or air driven, having an integral handle 100 upon which the usual trigger 102 is located whereby the motor 98 may be energized. The motor 98 may be bi-directional as controlled by the usual control, not shown, and as the drive unit 22 may consist of an off-the-shelf item, the cost of the drive unit is relatively low.

While the casing 12, and the attached drill unit 22, are light enough to be hand held, ease of use is achieved by suspending the casing from a counterweight cable, and an eye post 104 is preferably attached to the casing 12 for this purpose.

The welding wire guide system leading to the welder is shown at 103 and includes, at its entrance end, a guide head 106 having a groove 108. The groove 108 is adapted to receive the plunger 68 so that the guide head 106 may be selectively attached to the locator 66 by the plunger 68.

As will be appreciated, the guides 18 and 20 include radial slots 110 and 112 respectively so that loading of the wire feeder is simplified and the wire feeder may be removed from the welding wire once the welding wire is fully installed within the guide system.

The wire feeder 10 is used to charge the welding wire guide system 103 after the previous coil of welding wire has been depleted. The operator places the end of the new coil of welding wire which has been fed through the coil dispenser, not shown, and extends from the guide head 107 into the lower guide 20. Previously, the latch post 76 has been loosened by rotation of the knob 82 so that the latch post can be swung to the inoperative position shown in FIG. 4, clearing the casing housing arm 86 permitting the casing housing 14 to be pivoted to its open position shown in FIG. 4. With the casing housing 14 open, the welding wire can be easily placed into the lower guide 20 and fed into the upper guide 18. The periphery groove 36 defined on the drive roller 32 and the groove 56 defined on the periphery 54 of the backup roller 52 are in alignment with each other, and in alignment with the guides 18 and 20. Once the welding wire has been located in the upper guide 18, the casing housing 14 will be pivoted to the closed position shown in FIG. 1, the latch post 76 will be pivoted so that the cap 80 engages the casing arm 86, and the knob 82 tightened to compress spring 84 which forces the backup roller 52 toward the drive roller 32. When the casing housing 14 is moved to its closed position moving the backup roller 52 toward the drive roller 32, the teeth 60 of gear 58 will be brought in to mesh with the teeth 40 of the gear 38. Accordingly, this engagement of gear teeth will drive the backup roller 52 so that both rollers impart a linear axial movement to the welding wire gripped therebetween.

The entrance fitting guide head 106 of the guide system 103 will be inserted into the locator 66 once the plunger 68 has been withdrawn, and upon locating the guide head 106, the plunger 68 is permitted to enter the groove 108 of the head 106 under the influence of spring 70, locking the guide head 106 in position in alignment with the upper guide 18.

The wire feeder 10 is now "loaded" and the trigger 102 is depressed to energize the motor 98 which rotates driver 94 and drive roller 32 in such a manner as to feed the welding wire gripped by the rollers 32 and 52 into the guide system 103. The trigger 102 will continue to be depressed to energize the motor 98 until sufficient welding wire has been fed into the guide system 103 to locate the welding wire at the welding site, not shown, so that future feeding of the welding wire will be controlled by the welder feed mechanism, not shown.

Figure 4:
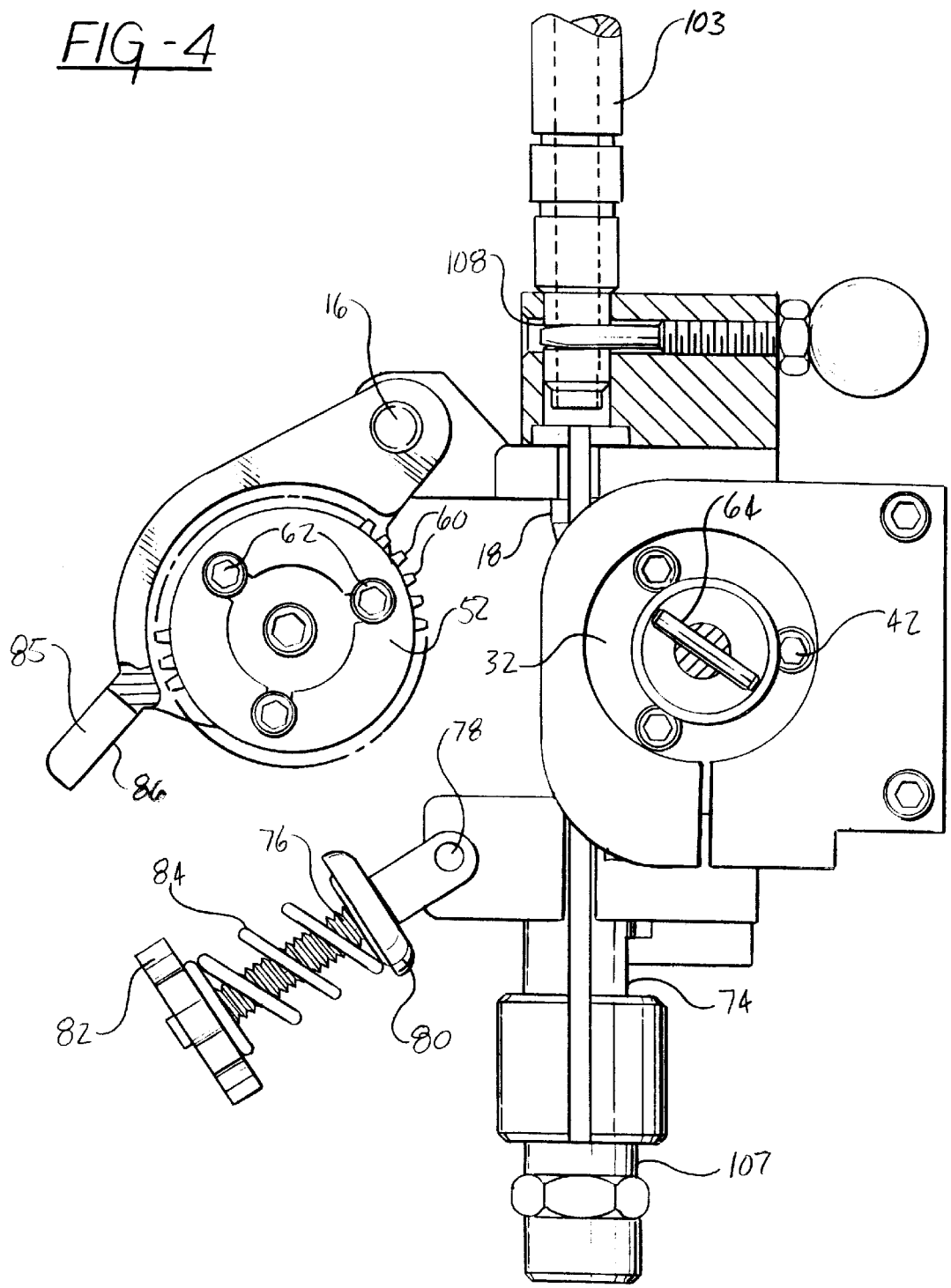
FIG. 4 is an elevational view, partially in section, similar to FIG. 1 illustrating the casing housing in an open position with the latch also open, the electric hand drill not being shown for clarity of illustration.

Once the new coil of welding wire has been sufficiently inserted into the guide system 103, trigger 102 is released to terminate operation of the motor 98, the knob 82 is unloosened so that the latch post 76 can be pivoted to the position shown in FIG. 4, the casing housing 14 is then opened to the position of FIG. 4 and the wire feeder 10 can be removed from the welding wire due to the slots 110 and 112 defined in the guides 18 and 20, respectively.

Usually, a plurality of coils of welding wire will be stored in adjacent relationships, and a single wire feeder 10 can be used to service a number of wire coil stations. The portable and relatively small size of the wire feeder 10 permits ready use of the wire feeder and manipulation and positioning thereof can be readily accomplished with little effort by the operator. The wire feeder of the invention quickly charges a wire feeder guide system with a new welding wire, and the invention eliminates the previous tedious procedure of manual insertion and feeding of welding wire into a guide system.

It is appreciated that various modifications to the inventive concepts may be apparent to those skilled in the art without departing from the spirit and scope of the invention.

What is claimed is:

1. A portable welding wire feeder for pushing welding wire received from a source remotely located from a welding site through an extensive wire guide system supplying welding wire to the welding site having a guide head comprising, in combination, a casing, a drive roller having a periphery rotatably mounted on said casing, a backup roller rotatably mounted on said casing having a periphery disposed adjacent said drive roller periphery whereby a welding wire received from the remote source can be interposed and gripped between said peripheries of said drive and backup rollers, a drive motor mounted on said casing in operative driving relationship to said drive roller, and inlet and exit wire guides defined on said casing in substantially tangential alignment with said peripheries of said drive and backup rollers at the point of minimum spacing between said rollers' peripheries, a casing housing defining a portion of said casing, a pivot pivotally supporting said casing housing on said casing for movement between open and closed positions, said backup roller being rotatably mounted upon said casing housing, and latch means mounted upon said casing holding said casing housing in said closed position, said peripheries of said drive and backup rollers being disposed adjacent each other for engaging welding wire when said casing housing is in said closed position, a first toothed drive gear concentrically fixed to said drive roller, a second toothed drive gear concentrically fixed to said backup roller, the teeth of said drive gears meshing upon said casing housing being pivoted to its closed position, said exit wire guide including a quick connect latch for attaching said exit wire guide to the welding wire guide system guide head.

2. In a portable welding wire feeder as in claim 1, said latch including a spring resiliently biasing said casing housing into said closed position.

\* \* \* \* \*